United States Patent Office 2,935,511
Patented May 3, 1960

2,935,511

PROCESS OF PREPARING 11β-HYDROXY STEROIDS

David Taub, Metuchen, Robert D. Hoffsommer, Rahway, and Norman L. Wendler, Summit, N.J., assignors to Merck & Co., Inc., Rahway, N.J., a corporation of New Jersey No Drawing. Application September 3, 1958
Serial No. 758,698

8 Claims. (Cl. 260—239.55)

This invention relates to an improved process for the preparation of 11β-hydroxy cortical steriods and is more particularly concerned with the production of 17-20,20-21-bismethylenedioxy-3-keto-11β-hydroxy steroids of the unsaturated pregnane series; 17-20,20-21-bismethylenedioxy-11β-hydroxy-4-pregnene-3-one and 17-20,20-21-bismethylenedioxy - 11β-hydroxy-1,4-pregnadiene-3-one and other novel intermediates formed in this process.

The present process comprises reducing the 3 and 11-keto groups in a 17-20,20-21-bismethylenedioxy-3,11-diketo steroid of the 4-pregnene or the 1,4-pregnadiene series, and subsequently selectively oxidizing the formed 3-hydroxy group to a 3-keto group, thereby producing the corresponding 17-20,20-21-bismethylenedioxy-11β-hydroxy-4-pregnene-3-one or the 17-20,20-21-bismethylenedioxy-11β-hydroxy-1,4-pregnadiene-3-one.

The present starting compounds, 17-20,20-21-bismethylenedioxy-3,11-diketo steroids of the unsaturated pregnane series, particularly 17-20,20-21-bismethylenedioxy-4-pregnene - 3,11 - dione, 17-20,20-21-bismethylenedioxy-1,4-pregnadiene - 3,11 - dione, 16-methyl-17-20,20-21-bismethylene-dioxy - 4 - pregnene-3,11-dione, 16-methyl-17-20,20-21 bismethylenedioxy - 1,4-pregnadiene-3,11-dione, and the corresponding 4-pregnene and 1,4-pregnadiene compounds containing additional methyl substituents attached, for example, to the 2 or the 6 positions, are conveniently prepared by contacting the corresponding 17α,21-dihydroxy-3,11,20-triketo steroid with formaldehyde in the presence of an acid to form the corresponding 17-20,20-21-bismethylenedioxy - 3,11 - diketo steroid. The preparation of the starting materials of our invention is shown in greater detail in Preparations 1 and 2 starting in column 4, line 21.

It was previously known to chemists skilled in the steroid art that the 11-keto group in a 3-oxygenated-17,21-dihydroxy-4-pregnene-11,20-dione could be reduced by first suitably protecting the 3 and 20-ketone groupings by formation of the corresponding 3,20-bissemicarbazone, reducing the 11-keto group with an alkali metal borohydride and subsequently regenerating the 3,20-diketone by hydrolysis with a strong acid. An alternative method, although not a preferable one, was to first form the 3,20-bisethylenedioxy derivatives of a 17,21-dihydroxy-4-pregnese-3,11,20-trione, reduce the 11-keto group in said bisethylenedioxy compound with lithium aluminum hydride and subsequently regenerate the 3 and the 20-ketone groupings by hydrolysis with a solution of a strong acid. It has been suggested that in order to reduce the 11-keto group to a 11β-hydroxy group in a 3-oxygenated-16β-methyl-17,21-dihydroxy steroid, first, the 3,20-bissemicarbazone of the steroid be formed; second, the steroid bissemicarbazone be reduced with sodium borohydride; and third, the desired product, the 3-oxygenated-16β-methyl-11β,17α,21-trihydroxy steroid be formed by treatment of the reduced bissemicarbazone with an acid. Unfortunately, this process, when employed in the preparation of certain 11β-hydroxy steroids such as 11β-hydroxy-16β-methyl steroids containing also a 17α-hydroxyl group, results in extensive elimination of the 17-hydroxyl group and a consequent poor yield of final product.

It is an object of the present invention to provide a novel process for the production of 3-oxygenated-17-20,20-21-bismethylenedioxy-11β-hydroxy steroids of the unsaturated pregnane series. It is a further object of this invention to provide an improved process for the conversion of the 11-keto group into the 11β-hydroxy group in steroids having a dihydroxy acetone sidechain at C-17 in high yield. Another object is the provision of novel steroid intermediates formed in the operation of this process. Another more specific object is the provision of a novel process for the production of hydrocortisone, prednisolone, 16-methyl hydrocortisone, 16-methyl-prednisolone, and other compounds containing additional methyl substituents as, for example, at positions 2 and 6 of the above enumerated compounds. For example, 16β-methyl - 17-20,20-21-bismethylenedioxy-4-pregnene-3,11-dione is treated with a solution of lithium aluminum hydride to produce 16β-methyl - 17-20,20-21 - bismethylenedioxy-3,11β-dihydroxy-4-pregnene, which latter compound is then treated with "activated" manganese dioxide to form 16β - methyl-17-20,20-21-bismethylenedioxy-11β-hydroxy-4-pregnene-3-one. This compound is then further treated with a solution of an acid to regenerate the cortical sidechain and form 16β-methyl-11β,17α,21-trihydroxy-4-pregnene-3,20-dione.

The starting compounds of the present application are 17-20,20-21-bismethylenedioxy-4-pregnene-3,11-dione or 17-20,20-21-bismethylenedioxy - 1,4 - pregnadiene-3,11-dione compounds. These steroids may have substituents such as hydroxy, keto, halo, or lower alkyl at other positions of the condensed ring nucleus, as, for instance, at positions 2, 6, 7, 9, 12, or 16. In addition to the double bond or bonds included in the A-ring of the starting compounds there may be one or more additional double bonds attached, for example, to carbon atoms 7, 11, or 14. Some representative examples of steroids made by the method of our invention from the corresponding 17-20,20-21-bismethylenedioxy-4-pregnene-3,11-dione or 17-20,20-21-bismethylenedioxy - 1,4 - pregnadiene-3,11-dione are 11β,17α,21-trihydroxy-4-pregnene-3,20-dione;
11β,17α,21-trihydroxy-1,4-pregnadiene-3,20-dione;
16α-methyl-11β,17α,21-trihydroxy-4-pregnene-3,20-dione;
16β-methyl-11β,17α,21-trihydroxy-4-pregnene-3,20-dione;
16α - methyl-11β,17α,21-trihydroxy-1,4-pregnadiene-3,20-dione;
16β - methyl-11β,17α,21-trihydroxy-1,4-pregnadiene-3,20-dione;
2,16α-dimethyl - 11β,17α,21 - trihydroxy-4-pregnene-3,20-dione;
2,16α-dimethyl - 11β,17α,21 - trihydroxy-1,4-pregnadiene-3,20-dione;
2,16β-dimethyl - 11β,17α,21 - trihydroxy-4-pregnene-3,20-dione;
2,16α-dimethyl - 11β,17α,21 - trihydroxy-1,4-pregnadiene-3,20-dione;
and 6,16β-dimethyl - 11β,17α,21 - trihydroxy-1,4-pregnadiene-3,20-dione.

Regarded in certain of its broader aspects, the present invention comprises reducing both the 3 and 11-keto substituents in a 17-20,20-21-bismethylenedioxy-3,11-diketo steroid of the 4-pregnene or the 1,4-pregnadiene series to form the corresponding 3,11β-dihydroxy steroid, and selectively oxidizing the 3-hydroxy group with activated manganese dioxide to form the corresponding 17-20,20-21 - bismethylenedioxy-11β-hydroxy-3-keto steroid of the 4-pregnene or the 1,4-pregnadiene series.

In carrying out the first step of our novel process the 17-20,20-21-bismethylenedioxy - 3,11 - diketo steroid is treated with a solution or a suspension of a metal hydride reducing agent to produce a novel 17-20,20-21-bismethylenedioxy-3,11β-dihydroxy steroid and at least one double bond included in the A-ring. Thus, for example, the above enumerated starting materials are converted by this reduction treatment to the novel 3,11β-dihydroxy steroids, e.g.

17-20,20-21 - bismethylenedioxy - 3,11β - dihydroxy-4-pregnene;
17-20,20-21-bismethylenedioxy - 3,11β - dihydroxy - 1,4-pregnadiene;
16α-methyl-17-20,20-21-bismethylenedioxy - 3,11β - dihydroxy-4-pregnene;
16β - methyl-17-20,20-21 - bismethylenedioxy - 3,11β - dihydroxy-4-pregnene;
16α-methyl-17-20,20-21-bismethylenedioxy - 3,11β - dihydroxy-1,4-pregnadiene;
16β-methyl-17-20,20-21-bismethylenedioxy - 3,11β - dihydroxy-1,4-pregnadiene;
2,16α-dimethyl-17-20,20-21 - bismethylenedioxy - 3,11β-dihydroxy-4-pregnene;
2,16β-dimethyl-17-20,20-21 - bismethylenedioxy - 3,11β-dihydroxy-4-pregnene;
2,16β-dimethyl-17-20,20-21 - bismethylenedioxy - 3,11β-dihydroxy-1,4-pregnadiene; and
6,16β-dimethyl-17-20,20-21 - bismethylenedioxy - 3,11β-dihydroxy-4-pregnene.

The process is carried out by mixing the 17-20,20-21-bismethylenedioxy-3,11-diketo steroid, using either order of addition, with at least a theoretical amount of metal hydride reducing agent such as, for example, lithium aluminum hydride, sodium borohydride, or lithium borohydride in an organic solvent which is non-reactive under the reaction conditions, at a temperature below about 120° C. preferably between about 5 and 20 moles of reducing agent per mole of starting steroid. The time for the reaction is not critical and may be varied between about one hour and up to about 24 hours. The length of time is dependent, of course, on the solvent, the temperature, and the particular reducing agent employed. The excess non-reacted reducing agent is then destroyed in the usual manner, preferably by the addition of an ice and water mixture or by the addition of a solution of a dilute acid and the resulting 17-20,20-21-bismethylenedioxy-3,11β-dihydroxy steroid separated from the reaction mixture by conventional methods such as filtration or extraction. The solvent used is generally one which is non-reactive under the reaction conditions and for this purpose there are a number which are suitable such as, for example, ether, benzene, tetrahydrofuran, and the like.

In a preferred embodiment of this reduction process, a solution of 16β-methyl-17-20,20-21-bismethylenedioxy-4-pregnene-3,11-dione in tetrahydrofuran is contacted, under nitrogen, with an excess of lithium aluminum hydride. The mixture is stirred and refluxed for about 2 hours. Following the reaction, the mixture is cooled and the excess reducing agent destroyed by the addition of ethyl acetate and the product recovered by extraction with ethyl acetate. After drying and removing the solvent by evaporation, there remains a residue comprising 16β-methyl-17-20,20-21-bismethylenedioxy - 3,11β - dihydroxy-4-pregnene.

In carrying out the selective oxidation process step of the present invention, the selected 17-20,20-21-bismethylenedioxy-3,11β-dihydroxy steroid, dissolved or suspended in an organic solvent such as acetone, ethyl acetate, tetrahydrofuran, carbon tetrachloride, chloroform and benzene, with acetone being preferred, is mixed with manganese dioxide in a weight ratio of about 5 to 20 times the weight of manganese dioxide to the weight of the steroid. The ratio of manganese dioxide starting steroid is not critical, larger or smaller the portion of manganese dioxide while being operative, however are of no advantage.

The temperature range is desirably between about −10 and +60° C. with a range between about 10 and 35° C. being preferred. In the preferred embodiment of the reaction, the reaction mixture is stirred at about 25° overnight (16 hours). The manganese dioxide used in the process is preferably "activated" according to the method of Attenburrow et al. [J. Chem. Soc. 1904 (1952)]. After the reaction is terminated, the product is isolated by conventional procedures, suitably the reaction mixture is filtered to remove the oxides of manganese, the filtrate containing the product is evaporated to remove the solvent, and the residual product is subjected to fractionation procedures such as recrystallization, extractions, and chromatography as described more fully in the examples. Utilizing this procedure and the 3,11β-dihydroxy steroids enumerated above, there are obtained the corresponding steroids in which the 3-hydroxy group has been selectively converted to a 3-keto group.

PREPARATION 1

*16β-methyl-17-20,20-21-bismethylenedioxy-4-pregnene-3,11-dione*

To a stirred solution of 7.43 g. of 16β-methyl-17α,21-dihydroxy-4-pregnene-3,11,20-trione in 365 ml. of methylene chloride at 25° C. was added a solution, pre-mixed at 0° C., of 110 ml. of low methanol content formaldehyde (37% aqueous solution) and 110 ml. of concentrated hydrochloric acid. The reaction mixture was stirred for 20 hours, followed by the addition of 960 ml. of water. The organic layer containing the product is separated and the aqueous layer extracted with three 200 ml. portions of methylene chloride to recover any product present in the water layer. The methylene chloride extracts were combined, washed successively with 200 ml. of water, excess aqueous potassium bicarbonate solution and twice more with 200 ml. portions of water. The washed extract of product is dried and evaporated to dryness in vacuo. The residue comprising 16β-methyl-17-20,20-21-bismethylenedioxy-4-pregnene-3,11-dione was triturated with ether to yield good crystalline product, M.P. 220–247° C.; dec.

$\lambda_{max}^{MeOH}$ 2380, E% 349; $\lambda_{max}^{CHCl_3}$ 5.86, 6.00, 6.15, 9.1–9.2μ

In similar manner 16α-methyl-17α,21-dihydroxy-4-pregnene-3,11-20-trione is converted to 16α-methyl-17-20,20-21-bismethylenedioxy-4-pregnene-3,11-dione, and 17α,21-dihydroxy-4-pregnene-3,11,20-trione to 17-20,20-21-bismethylenedioxy-4-pregnene-3,11-dione.

PREPARATION 2

*16β-methyl-17-20,20-21-bismethylenedioxy-1,4-pregnadiene-3,11-dione*

To a stirred solution of 1.15 g. of 16β-methyl-17α,21-dihydroxy-1,4-pregnadiene-3,11,20-trione in 60 ml. of methylene chloride was added a cooled, pre-mixed solution of 17 ml. of 37% aqueous formaldehyde (low ethanol) and 17 ml. of concentrated hydrochloric acid. The mixture was stirred vigorously for 40 hours at 25° C. Approximately 120 ml. of water was added to the reaction mixture, the organic layer containing the product separated, and the aqueous layer back-extracted three times with methylene chloride. The combined organic extract was washed with excess aqueous 5% potassium bicarbonate solution and with water and dried over magnesium sulfate. The solvent was removed from the product containing the extract by evaporation in vacuo to yield a residue of 16β-methyl-17-20,20-21-bismethylenedioxy-1,4-pregnadiene-3,11-dione which was crystallized from acetone-ether, M.P. 203–206° C.;

$\lambda_{max}^{CH_3OH}$ 238, mμ E% 370; $\lambda_{max}^{CHCl_3}$ 5.84, 6.00, 6.13, 6.19, 9.15μ

In similar manner 16α-methyl-17α,21-dihydroxy-1,4-pregnadiene-3,11,20-trione is converted to 16α-methyl-17-20,20-21-bismethylenedioxy-1,4-pregnadiene-3,11 - dione, and 17α,21-dihydroxy-1,4-pregnadiene-3,11,20-trione to 17-20,20-21-bismethylenedioxy - 1,4 - pregnadiene - 3,11- dione.

The following examples illustrate the process and products of the present invention but are not to be considered as limiting.

EXAMPLE 1
*16β-methyl-17-20,20-21-bismethylenedioxy-11β-hydroxy-4-pregnene-3-one*

A. REDUCTION STEP

To a stirred solution of 2 g. of lithium aluminum hydride in 200 ml. of dried tetrahydrofuran, under nitrogen, was added a solution of 2 g. of 16β-methyl-17-20,20-21-bismethylenedioxy-4-pregnene-3,11-dione in 100 ml. of tetrahydrofuran. After the addition was complete (10 minutes) the reaction mixture was stirred at the reflux temperature for 100 minutes. The reaction mixture was cooled to 5° C. and treated cautiously with 50 ml. of ethyl acetate to destroy any excess lithium aluminum hydride present. Approximately 100 ml. of saturated aqueous sodium sulfate solution was added to effect precipitation of the inorganic salts present, following which, 100 g. of anhydrous magnesium sulfate was added to remove any water present in the mixture. The resulting mixture was filtered and the inorganic precipitate washed thoroughly on the filter with ethyl acetate to remove any occluded steroid, the washings and filtrate combined and evaporated to dryness in vacuo to give 16β-methyl-17-20,20-21-bismethylenedioxy - 3,11 - dihydroxy - 4 - pregnene, M.P. 237–246° C.

B. SELECTIVE OXIDATION STEP

To a solution of 1.9 g. of the product obtained in Part A above in 200 ml. of acetone and 100 ml. of benzene was warmed on the steam bath to remove any moisture by azeotropic distillation. The solution was cooled to room temperature (25° C.) and 30 g. of manganese dioxide prepared according to the procedure of Attenburrow et al. [J. Chem. Soc. 1904 (1952)] were added. The reaction mixture was stirred at room temperature for about 16 hours, filtered through celite, the filter pad washed thoroughly with acetone to remove occluded steroid and the combined filtrate and washings containing the product evaporated to dryness in vacuo. The residual material afforded on trituration with ether crystalline 16β-methyl-17-20,20 - 21 - bismethylenedioxy-11β-hydroxy-4-pregnene-3-one. Recrystallization from acetone ether yielded material melting at 226–242° C., $\lambda_{max}^{MeOH}$ 2420, E% 370

EXAMPLE 2
*16α-methyl-17-20,20-21-bismethylenedioxy-11β-hydroxy-4-pregnene-3-one*

In the manner given in Example 1, 16α-methyl-17-20,20-21-bismethylenedioxy-4-pregnene-3,11-dione is reduced with lithium aluminum hydride to form 16α-methyl - 17 - 20,20 - 21 - bismethylenedioxy - 3,11β - dihydroxy-4-pregnene, the crude product recovered from the reduction dissolved in acetone and oxidized with activated manganese dioxide to give 16α-methyl-17-20,20-21-bismethylenedioxy-11β-hydroxy-4-pregnene-3-one.

EXAMPLE 3
*17-20,20-21-bismethylenedioxy-11β-hydroxy-4-pregnene-3-one*

In the manner given in Example 1, 17-20,20-21-bismethylenedioxy-4-pregnene-3,11-dione is reduced with lithium aluminum hydride to form 17-20,20-21-bismethylenedioxy-3,11β-dihydroxy-4-pregnene and the crude product recovered from the reduction step dissolved in acetone and oxidized with activated manganese dioxide to give 17-20,20-21-bismethylenedioxy-11β-hydroxy-4-pregnene-3-one.

EXAMPLE 4
*2,16β-dimethyl-17-20,20-21-bismethylenedioxy-11β-hydroxy-4-pregnene-3-one*

In the manner given in Example 1, 2,16β-dimethyl-17-20,20-21-bismethylenedioxy-4-pregnene-3,11-dione is reduced with lithium aluminum hydride to form 2,16β-dimethyl-17-20,20-21 - bismethylenedioxy - 3,11β - dihydroxy-4-pregnene and the crude recovered product dissolved in acetone and oxidized with activated manganese dioxide to give 2,16β-dimethyl-17-20,20-21-bismethylenedioxy-11β-hydroxy-4-pregnene-3-one.

EXAMPLE 5
*6,16β-dimethyl-17-20,20-21-bismethylenedioxy-11β-hydroxy-4-pregnene-3-one*

In the manner given in Example 1, 6,16β-dimethyl-17-20,20-21-bismethylenedioxy-4-pregnene-3,11 - dione is reduced with lithium aluminum hydride to form 2,16β-dimethyl-17-20,20-21 - bismethylenedioxy - 3,11β - dihydroxy-4-pregnene, and the crude recovered product dissolved in acetone and oxidized with activated manganese dioxide to form 2,16β-dimethyl-17-20,20-21-bismethylenedioxy-11β-hydroxy-4-pregnene-3-one.

EXAMPLE 6
*16β-methyl-17-20,20-21-bismethylenedioxy-11β-hydroxy-1,4-pregnadiene-3-one*

A. REDUCTION STEP

A solution of 100 mg. of 16β-methyl-17-20,20-21-bismethylenedioxy-1,4-pregnadiene-3,11-dione in 10 ml. of dry tetrahydrofuran was added to a stirred solution of 100 mg. of lithium aluminum hydride in 50 ml. of tetrahydrofuran. The mixture was refluxed, under nitrogen, for 90 minutes. The reaction mixture was then cooled and 1 ml. of ethyl acetate was added to destroy the excess lithium aluminum hydride. To the reaction mixture was then added 1 ml. of saturated aqueous sodium sulfate solution to precipitate any inorganic salts present and 2 g. of anhydrous magnesium sulfate to remove traces of moisture.

The mixture was filtered to remove the precipitated inorganic salts, the inorganic precipitate washed with ethyl acetate to dissolve any occluded steroid and the filtrate and washings combined and evaporated to dryness in vacuo to give a residue comprising 16β-methyl-17-20, 20 - 21 - bismethylenedioxy - 3,11β - dihydroxy - 1,4-pregnadiene.

B. SELECTIVE OXIDATION STEP

The entire crude product from Part A of this example is dissolved in 10 ml. of acetone and 5 ml. of benzene, 1.5 g. of activated manganese dioxide was added and the mixture stirred at room temperature for about 15 hours. The entire mixture was cooled and filtered to remove the oxides of manganese, the precipitate washed with benzene to remove any occluded steroid and the filtrate and washings containing the product evaporated to dryness to give a residue comprising 16β-methyl-17-20,20-21-bismethylenedioxy-11β-hydroxy-1,4-pregnadiene-3-one. This residual material is chromatographed on neutral alumina and eluted with benzene to afford substantially pure product.

EXAMPLE 7
*16α-methyl-17-20,20-21-bismethylenedioxy-11β-hydroxy-1,4-pregnadiene-3-one*

In the manner given in Example 6, 16α-methyl-17-20, 20-21-bismethylenedioxy-1,4-pregnadiene-3,11-dione is reduced with lithium aluminum hydride and the recovered crude 16α-methyl-17-20,20-21-bismethylenedioxy-3,11β-dihydroxy-1,4-pregnadiene was oxidized with activated manganese dioxide to give 16α-methyl-17-20,20-21-bismethylenedioxy-11β-hydroxy-1,4-pregnadiene-3-one.

Example 8

17-20,20-21-bismethylenedioxy-11β-hydroxy-1,4-pregnadiene-3-one

In the manner given in Example 6, 17-20,20-21-bismethylenedioxy-1,4-pregnadiene-3,11-dione is reduced with lithium aluminum hydride to form 17-20,20-21-bismethylenedioxy-3,11β-dihydroxy-1,4-pregnadiene and the crude product thus obtained is oxidized with activated manganese dioxide to give 17-20,20-21-bismethylenedioxy-11β-hydroxy-1,4-pregnadiene-3-one.

Example 9

6,16β-dimethyl-17-20,20-21-bismethylenedioxy-11β-hydroxy-1,4-pregnadiene-3-one In the manner given in Example 6, 6,16β-dimethyl-17-20,20-21-bismethylenedioxy-1,4-pregnadiene-3,11-dione is reduced with lithium aluminum hydride to form 6,16β-dimethyl - 17 - 20,20 - 21 - bismethylenedioxy - 3,11β - dihydroxy-1,4-pregnadiene and the crude product dissolved in acetone and oxidized with activated manganese dioxide to form 6,16β-dimethyl-17-20,20-21-bismethylenedioxy-11β-hydroxy-1,4-pregnadiene-3-one.

Example 10

17-20,20-21-bismethylenedioxy-11β-hydroxy-4-pregnen-3-one

To a solution of 150 mg. of 17-20,20-21-bismethylenedioxy-4-pregnene-3,11-dione compound in 10 ml. of tetrahydrofuran was added 200 mg. of sodium borohydride and 2 ml. of water. The mixture was stirred and refluxed for about 15 hours. The entire reaction mixture was then cooled, 1 ml. of acetic acid in 2 ml. of water was added to destroy the excess reducing agent and a portion of the solvent removed from the reaction mixture by concentration in vacuo. Additional water was added to effect complete precipitation of the product, 17-20,20-21-bismethylenedioxy-3,11β-dihydroxy-4-pregnene, and the precipitated product filtered, washed with water, and thoroughly dried. This product was then dissolved in acetone and benzene and oxidized with activated manganese dioxide to form 17 - 20,20 - 21 - bismethylenedioxy - 11β - hydroxy - 4-pregnene-3-one.

The 16α-methyl-11-oxygenated-4-pregnene-17α,21-diol-3,20-dione used as starting materials in this process are conveniently prepared starting with the known 16-pregnene-3α-ol-11,20-dione 3-acetate in accordance with the following procedure: 16-pregnene-3α-ol-11,20-dione 3-acetate is reacted with methyl magnesium iodide in the presence of cuprous chloride thereby forming 16α-methyl-pregnane-3α-ol-11,20-dione 3-acetate, which is reacted with aqueous methanolic hydrochloric acid to form 16α-methyl-pregnane-3α-ol-11,20-dione. The latter compound is reacted with acetic anhydride in the presence of p-toluene sulfonic acid catalyst to form a mixture of enol acetates containing 16α-methyl-17,20-pregnene-3α,20-diol-11-one 3,20-diacetate; this mixture, after chromatographic purification to remove any unchanged starting material, is reacted with perbenzoic acid and the resulting 16α-methyl-17α,20-epoxypregnane-3α,20-diol-11-one 3,20-diacetate is hydrolyzed with methanolic potassium bicarbonate to produce 16α-methyl-pregnane-3α,17α-diol-11,20-dione. The latter compound is reacted with bromine in chloroform to form 21-bromo-16α-methyl-pregnane-3α,17α-diol-11,20-dione which is converted without isolation to 16α-methyl-pregnane-3α,17α,21-triol-11,20-dione 21-acetate by reaction with anhydrous potassium acetate; this compound is reacted with chromium trioxide in pyridine to form 16α-methyl-pregnane-17α,21-diol-3,11,20-trione 21-acetate. The 16α-methyl-pregnane-17α,21-diol-3,11,20-trione 21-acetate is reacted with bromine in glacial acetic acid-chloroform to produce 4-bromo-16α-methyl-pregnane-17α,21-diol-3,11,20-trione, which is then reacted with semicarbazide to form 16α-methyl-4-pregnene-17α,21-diol-3,11,20-trione 3,20-bissemicarbazone 21-acetate.

The 16α-methyl-4-pregnene-17α,21-diol-3,11,20-trione-3,20-bissemicarbazone 21-acetate is reacted with potassium bicarbonate or potassium hydroxide in aqueous methanol to form 16α-methyl-4-pregnene-17α,21-diol-3,11,20-trione-3,20-bissemicarbazone which is then hydrolyzed under acid conditions to produce 16α-methyl-4-pregnene-17α,21-diol-3,11,20-trione 21-free alcohol. This 16α-methyl-17α,21-dihydroxy-4-pregnene-3,11,20-trione is then contacted with a growing culture of Bacillus sphaericus (ATTC–4525) microorganisms to form 16α-methyl-17α,21-dihydroxy-1,4-pregnadiene-3,11,20-trione. These procedures are more fully described in the co-pending application of Glen E. Arth, David Johnston, and Lewis H. Sarett; Serial Number 642,655; filed September 27, 1957.

The 16β-methyl steroids used as the starting materials can be prepared in accordance with the following processes:

To a solution of 3α-acetoxy-16-pregnene-11,20-dione in a mixture of tetrahydrofuran and ethyl ether is added diazomethane to produce 3α-acetoxy-16α,17α-methyleneazopregnane-11,20-dione (M.P. 186–190° C.) which precipitated from solution. Heating this compound at about 180° C. in vacuo produces 3α-acetoxy-16-methyl-16-pregnene-11,20-dione (M.P. 165–167° C.) which upon reaction with hydrogen peroxide in the presence of sodium hydroxide in methanol solution for 18 hours at room temperature affords 16α,17α - epoxy - 3α - hydroxy - 16β - methyl - pregnane - 11,20 - dione (M.P. 178–180° C.). When this compound is treated with perchloric acid in aqueous dioxane at 25–30° C. for 65 hours and the resulting reaction mixture is diluted with water a mixture of 3α,17α - dihydroxy-16-methyl-15-pregnene-11,20-dione and 3α,17α-dihydroxy-16-methylene-pregnane (M.P. 158–167° C.) is precipitated and recovered by filtration. Reduction of this mixture with hydrogen in methanol in the presence of palladium-calcium carbonate catalyst affords a mixture of 3α,17α-dihydroxy-16α-methyl-pregnane-11,20-dione and 3α,17α-dihydroxy-16β-methyl-pregnane-11,20-dione sintering at 150° C. Bromination of this mixture with bromine in chloroform at 40–45° C. affords a mixture of 21 - bromo - 3α,17 - dihydroxy - 16α - methylpregnane - 11,20 - dione and 21-bromo-3α,17-dihydroxy-16β-methylpregnane-11,20-dione which upon reaction with potassium acetate and potassium iodide in acetone produces a mixture of 3α,17α,21-trihydroxy-16β-methylpregnane-11,20-dione-21-acetate and 3α,17α,21-trihydroxy-16α-methylpregnane-11,20-dione-21-acetate. To a solution of this mixture in aqueous t-butanol at 10–15° C. is added N-bromosuccinimide to produce a mixture of 17α,21-dihydroxy-16α-methylpregnane-3,11,20-trione-21-acetate and 17α,21 - dihydroxy-16β-methylpregnane-3,11,20-trione-21-acetate which on chromatography on neutral alumina and elution with chloroform-benzene (1: 1) and benzene yields 17α,21-dihydroxy-16β-methylpregnane-3,11,20-trione-21-acetate (M.P. 210–213° C.). Reaction of this compound with bromine in a mixture of acetic acid and chloroform affords the corresponding 4-bromo compound (M.P. 165–170° C. dec.) which is converted by reaction with semicarbazide to the 3-semicarbazone of 17α,21-dihydroxy-16β-methyl-4-pregnene-3,11,20-trione-21-acetate. Treatment of this compound with a mixture of acetic acid and pyruvic acid gives 17α,21-dihydroxy - 16β-methyl-4-pregnene-3,11,20-trione-21-acetate (M.P. 226–232°C.). The 16β-methyl-17α,21-dihydroxy-4-pregnene-3,11,20-trione-21-acetate so obtained is then reacted with potassium bicarbonate in aqueous methanol to produce 16β - methyl - 17α,21-dihydroxy-4-pregnene-3,11,20-trione. This compound is converted to the corresponding 1,4-pregnadiene compound, 16β-methyl-17α,21-dihydroxy - 1,4 - pregnadiene-3,11,20-trione, by reacting it with selenium dioxide in t-butyl alcohol under reflux temperatures for 48 hours. These processes are more fully described in the co-pending application of David Taub, Norman L. Wendler, and Harry L. Slates; Serial Number 722,390; filed March 19, 1958.

The 6,16-dimethyl steroid compounds used as starting materials may be prepared in accordance with the following procedures:

16 - methyl-4-pregnene-17α,21-diol-3,11,20-trione is reacted with formaldehyde under acidic conditions to form 17α - 20,20-21-bismethylenedioxy-16α-methyl-4-pregnene-3,11-dione which is reacted with ethylene glycol in the presence of an acidic catalyst to produce 3-ethylenedioxy- 17α - 20,20-21-bismethylenedioxy-16α-methyl-5-pregnene-11-one. The latter compound is reacted with perbenzoic acid, perphthalic acid and the like, thereby forming 3-ethylenedioxy - 17α - 20,20 - 21 - bismethylenedioxy - 5,6-epoxy-16α-methyl-pregnane-11-one which is then reacted with formic acid to produce a mixture of 17α-20,20-21-bismethylenedioxy - 16α - methyl - 6-formyloxy-pregnane-5-ol-3,11-dione and 17α-20,20-21-bismethylenedioxy-16α-methyl-5-formyloxy-pregnane-6-ol-3,11-dione, which mixture, upon reaction with an aqueous alkali hydroxide solution, is converted to 17α-20,20-21-bismethylenedioxy-16α-methyl-allopregnane-3,6,11-trione. The last-named compound is reacted with butanone dioxolane to produce 3 - ethylenedioxy - 17α - 20,20-21-bismethylenedioxy-16α-methylallopregnane-6,11-dione which is reacted with a methyl Grignard reagent to form 3-ethylenedioxy-17α-20,20 - 21 - bismethylenedioxy - 6α,16α-dimethyl-allopregnane - 6β - ol-11-one. This 3-ethylenedioxy-17α-20,20-21-bismethylenedioxy - 6α - 16α-dimethyl-allopregnane-6β-ol-11-one is reacted with a dehydrating agent such as thionyl chloride in pyridine to form the corresponding 3-ethylenedioxy - 17α-20,20-21-bismethylenedioxy-6,16α-dimethyl-5-pregnene-11-one, which, upon reaction with p-toluene sulfonic acid monohydrate in acetone is converted to 17α-20,20 - 21-bismethylenedioxy-6α,16α-dimethyl-4-pregnene-3,11-dione; the latter compound is reacted with an aqueous organic acid hydrolyzing agent to form 6α,16α-dimethyl-4-pregnene-17α,21-diol-3,11,20-trione. The 6,16-dimethyl-17-20,20-21-bismethylenedioxy-4-pregnene-3,11-dione compounds are contacted with the dehydrogenating activity of a growing culture of *Bacillus sphaericus* (ATTC–4525) microorganisms, or with selenium dioxide, thereby forming the corresponding 6,16-dimethyl-17-20,-20-21 - bismethylenedioxy - 1,4-pregnadiene - 3,11 - dione compound.

These procedures are described in more complete detail in the co-pending application of Glen E. Arth, Roger E. Beyler, and Lewis H. Sarett; Serial Number 683,923; filed September 16, 1957.

The 2,16-dimethyl steroid starting materials are prepared by reacting a 16-methyl-17-20,20-21-bismethylenedioxy-4-pregnene-3,11-dione compound with diethyl oxalte and sodium methylate dissolved in t-butanol and benzene to form a 16-methyl-17-20,20-21-bismethylenedioxy-2-ethoxyoxalyl-4-pregnene-3,11-dione. After neutralization of the reaction mixture and recovery of the 2-ethoxyoxalyl product by extraction, the solvent was removed by evaporation and replaced with acetone. To the reaction solution was then added methyl iodide in the presence of potassium bicarbonate to form 2,16-dimethyl-17-20,20-21-bismethylenedioxy-2-ethoxyoxalyl-4-pregnene-3,11- dione which was recovered by removal of the solvent in vacuo and extraction of the residual product with methylene chloride. The methylene chloride was then removed from the product by evaporation, the residue dissolved in methanol and hydrolyzed by treatment of the solution with sodium methylate in methanol for about 6 hours to form 2,16-dimethyl-17-20,20 - 21 - bismethylenedioxy - 4 - pregnene-3,11-dione.

These processes are more fully described in the co-pending application of Meyer Sletzinger, Donald Reinhold, and John Chemerda; Serial Number 754,722, filed August 13, 1958.

We claim:

1. The process which comprises intimately contacting a 17-20,20-21-bismethylenedioxy-3,11-diketo steroid of the pregnane series, having the general formula:

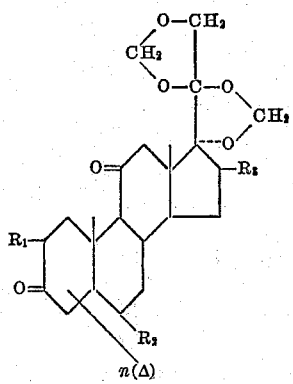

wherein $R_1$, $R_2$ and $R_3$ are members selected from the group consisting of hydrogen and methyl, $\Delta$ is a carbon to carbon double bond included in the A-ring of the above formula and $n$ is a whole integer varying between the limits of 1 and 2, inclusive, with a metal hyride to form the corresponding 3,11β-dihydroxy steroid and treating said 3,11β-dihydroxy steroid with activated manganese dioxide to form a 17-20,20-21-bismethylenedioxy-3-keto-11-hydroxy steroid of the pregnane series having the general formula;

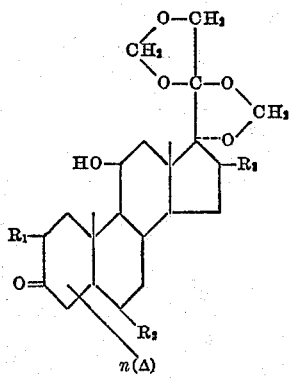

wherein $R_1$, $R_2$ and $R_3$ are members selected from the group consisting of hydrogen and methyl, $\Delta$ is a carbon to carbon double bond included in the A-ring of the above formula and $n$ is a whole integer varying between the limits of 1 and 2, inclusive.

2. The process which comprises intimately contacting 17-20,20-21-bismethylenedioxy- 4 - pregnene - 3,11 - dione with a metal hydride reducing agent to form 17-20,20-21-bismethylenedioxy-3,11β-dihydroxy-4-pregnene and intimately contacting said 3,11β-dihydroxy-4-pregnene with activated manganese dioxide 17-20,20-21-bismethylenedioxy-11β-hydroxy-4-pregnen-3-one.

3. The process which comprises intimately contacting 16α-methyl-17-20,20-21-bismethylenedioxy-4-pregnene- 3,. 11-dione with a metal hydride to form the corresponding 3,11β-dihydroxy-4-pregnene and intimately contacting said 3,11β-dihydroxy-4-pregnene with activated manganese dioxide to form 16α-methyl-17-20,20-21-bismethyl-enedioxy-11β-hydroxy-4-pregnen-3-one.

4. The process which comprises intimately contacting 16β-methyl-17-20,20-21-bismethylenedioxy-4-pregnene - 3,. 11-dione with a metal hydride to form the corresponding 3,11β-dihydroxy-4-pregnene and intimately contacting said 3,11β-dihydroxy-4-pregnene with activated manganese dioxide to form 16β-methyl-17-20,20-21-bismethylenedioxy-11β-hydroxy-4-pregnen-3-one.

5. The process which comprises intimately contacting a 17-20,20-21-bismethylenedioxy-3,11β - dihydroxy steroid of the pregnane series, having the general formula:

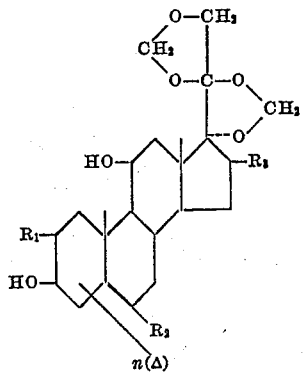

wherein $R_1$, $R_2$ and $R_3$ are members selected from the group consisting of hydrogen and methyl, $\Delta$ is a carbon to carbon double bond, included in the A-ring of the formula and $n$ is a whole integer varying between the limits of 1 and 2, inclusive, with activated manganese dioxide to form a 17-20,20-21-bismethylenedioxy-3-keto-11β-hydroxy steroid of the pregnane series having the general formula;

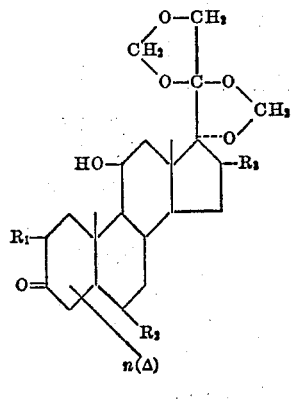

wherein $R_1$, $R_2$ and $R_3$ are members selected from the group consisting of hydrogen and methyl, $\Delta$ is a carbon to carbon double bond included in the A-ring of the above formula and $n$ is a whole integer varying between the limits of 1 and 2, inclusive.

6. The process which comprises intimately contacting 17-20,20-21-bismethylenedioxy-3,11β-dihydroxy - 4 -pregnene with activated manganese dioxide to form 17-20,20-21-bismethylenedioxy-11β-hydroxy-4-pregnen-3-one.

7. The process which comprises intimately contacting 16α-methyl-17-20,20-21-bismethylenedioxy - 3,11β - dihydroxy-4-pregnene with activated manganese dioxide to form 16α-methyl-17-20,20-21-bismethylenedioxy-11β - hydroxy-4-pregnen-3-one.

8. The process which comprises intimately contacting 16β-methyl-17-20,20-21-bismethylenedioxy - 3,11β - dihy - droxy-4-pregnene with activated manganese dioxide to form 16β-methyl-17-20,20-21-bismethylenedioxy-11β - hydroxy-4-pregnen-3-one.

References Cited in the file of this patent

UNITED STATES PATENTS

| | | |
|---|---|---|
| 2,739,974 | Colton | Mar. 27, 1956 |
| 2,842,542 | Beal | July 8, 1958 |
| 2,843,609 | Colton | July 15, 1958 |

OTHER REFERENCES

Fieser and Fieser: Natural Products Related to Phenanthrene, 3rd edition (1949), page 410.